(12) United States Patent
Akins et al.

(10) Patent No.: US 6,285,426 B1
(45) Date of Patent: Sep. 4, 2001

(54) RIDGED REFLECTOR HAVING OPTICALLY TRANSMISSIVE PROPERTIES FOR AN OPTICAL DISPLAY DEVICE

(75) Inventors: Robert Benjamin Akins, Palatine; Kevin William Jelley, LaGrange Park; George Thomas Valliath, Buffalo Grove, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/110,576

(22) Filed: Jul. 6, 1998

(51) Int. Cl.[7] ................................................ G02F 1/1335
(52) U.S. Cl. ............................. 349/114; 349/67; 349/113
(58) Field of Search ................................ 349/67, 61, 114, 349/162, 137, 113

(56) References Cited

U.S. PATENT DOCUMENTS

| | | |
|---|---|---|
| 3,752,974 | 8/1973 | Baker et al. . |
| 4,011,001 | 3/1977 | Moriya . |
| 4,017,155 | 4/1977 | Yagi et al. . |
| 4,252,416 | 2/1981 | Jaccard . |
| 4,282,560 | 8/1981 | Kringel et al. . |
| 4,573,766 | 3/1986 | Bourney, Jr. et al. . |
| 4,737,896 | 4/1988 | Mochizuki et al. . |
| 4,798,448 | 1/1989 | van Raalte . |
| 4,799,137 | 1/1989 | Aho . |
| 4,822,145 | 4/1989 | Staelin . |
| 4,874,228 | 10/1989 | Aho et al. . |
| 4,896,953 | 1/1990 | Cobb, Jr. . |
| 4,929,062 | 5/1990 | Guzik et al. . |
| 4,975,808 | 12/1990 | Bond et al. . |
| 4,989,125 | 1/1991 | Cobb, Jr. et al. . |
| 5,005,108 | 4/1991 | Pristash et al. . |
| 5,029,060 | 7/1991 | Aho et al. . |
| 5,040,878 | 8/1991 | Eichenlaub . |
| 5,040,883 | 8/1991 | Cobb, Jr. . |
| 5,070,431 | 12/1991 | Kitazawa et al. . |
| 5,136,479 | 8/1992 | Ruffner . |
| 5,190,370 | 3/1993 | Miller et al. . |
| 5,477,239 | 12/1995 | Busch et al. . |
| 5,608,550 | * 3/1997 | Epstein et al. ........................ 359/40 |
| 5,838,403 | * 11/1998 | Jannson et al. ....................... 349/65 |
| 5,854,872 | * 12/1998 | Tai ....................................... 385/133 |
| 6,072,551 | * 3/1997 | Jannson et al. ....................... 349/64 |
| 6,091,469 | * 7/2000 | Naito .................................... 349/113 |

OTHER PUBLICATIONS

Hiyama, et al., "P–45: High–Performance Reflective STN–LCD with a Blazed Reflector", *SID 97 Digest*, pp. 655–658.

* cited by examiner

*Primary Examiner*—Kenneth Parker
*Assistant Examiner*—Mike Qi
(74) *Attorney, Agent, or Firm*—Douglas D. Fekete

(57) ABSTRACT

A ridged reflector (10) permits operation of an optical display device (12) in ambient light, which may be supplemented by artificial back-lighting. The ridged reflector (10) for use in an optical display (12) includes a transparent polymeric layer (70) having a ridged surface (32). The ridged surface (32) includes a series of ridges (36). Each of the ridges (36) has a first face (42) and a second face (44) preferably intersecting the first face (42). A reflective layer (68) overlies the first face (42) of each of the ridges (36). The second face 44 (44) is generally light-transmissive and substantially free of a reflective layer (68). The ridged surface (32) has an opposite surface (34) opposite the ridged surface (32). The second face (44) of each of said ridges (36) allows optical communication with the opposite surface (34) for optional back-lighting of the optical display device.

28 Claims, 6 Drawing Sheets

RIDGED REFLECTOR HAVING OPTICALLY TRANSMISSIVE PROPERTIES FOR AN OPTICAL DISPLAY DEVICE

BACKGROUND ART

The present invention relates generally to a ridged reflector for use in optical displays and an optical display device incorporating the reflector. More particularly, the present invention relates to a ridged reflector having optically transmissive properties for use in back-lighted and reflective liquid crystal displays.

Reflectors are often used in optical displays, such as liquid crystal displays, to permit viewing of the displays in ambient light alone. Prior art reflectors include planar specular reflectors and planar diffuse reflectors. Specular reflectors include a substantially planar surface that is covered with a reflective metallic coating. Specular reflectors are characterized by an angle of incidence being substantially equal to the angle of reflection. Diffuse reflectors typically have a roughened surface which is predominately coated with a metallic reflective coating. Diffuse reflectors are characterized by reflecting and scattering incident light. However, neither prior art specular reflectors, nor diffuse reflectors adequately compensate for the effects of glare in optical displays.

Glare represents an unwanted reflection of incident light off any refractive interface associated with a display device. In practice, the refractive interfaces are generally planar with smooth surfaces that are substantially parallel to one another so that the glare from multiple refractive interfaces may be additive. In general, as the difference between refractive indexes increases at the refractive interface, the amount of reflection also increases from the impedance mismatch at the refractive interface. Glare is characterized in that angle of incidence approximately equals the magnitude of the angle of reflection. Glare typically occurs at both glancing incident angles and nonglancing incident angles relative to any refractive interface above the liquid crystal material of the display device. Perceived glare is glare which is coincident with or lies within a preferential viewing cone of an optical display. Perceived glare may be perceived by a viewer and may detract from the usable brightness and the legibility of the display. Actual glare may exist regardless of whether or not, it is actually perceived by a viewer.

Glare may be categorized as primary glare and secondary glare. Primary glare occurs as ambient light is reflected from an exterior face of an optical display. Primary glare is typically more prevalent and bothersome to a viewer than secondary glare. Secondary glare occurs as ambient light is reflected from other refractive interfaces within the display without first reaching the reflector. For example, in a twisted nematic display secondary glare occurs when light entering the display is reflected from indium-tin oxide electrodes.

Commercially available glare-reducing films have been used in optical displays to match different impedances at the refractive interfaces so as to reduce glare reflections. The glare-reducing film generally has a thicknesses which is an integer multiple of a quarter wavelength within the visible light frequency range. However, glare reducing films tend to increase manufacturing costs in a manner which discourages their wide-spread commercial use.

Specular and diffusive reflectors may be further characterized as single-mode or dual-mode reflectors. Single-mode reflectors merely reflect light. Dual-mode reflectors have both a reflective mode and a transmissive mode. Dual-mode reflectors are sometimes referred to as transflectors. The reflective operational mode is desired when using the device in ambient light. The transmissive mode is desired when using the device in the dark or when inadequate ambient light is present. A severe limitation of dual-mode reflectors is that the percentage of transmissiveness of the transmissive mode usually may only be increased at the expense of decreasing the percentage of reflectivity of the reflective mode, and vice versa. For example, typical commercially available dual-mode reflectors may offer 70 percent reflectivity and 30 percent transmissiveness, or 60 percent reflectivity and 40 percent transmissiveness.

Thus, a need exists for a reflector which reduces perceived glare in display devices. In addition, a need exists for a dual-mode reflector which reduces perceived glare, while permitting efficient use and improved legibility of displays with back-lighting, ambient light, or both.

SUMMARY OF THE INVENTION

The invention relates to a ridged reflector permitting operation of an optical device in ambient light. The ridged reflector for use in an optical display includes an optically transmissive layer having a ridged surface. The ridged surface includes a series of ridges. Each of the ridges has a first face and a second face preferably intersecting the first face. A reflective layer overlies the first face of each of the ridges, while the second face is light-transmissive and substantially free of the reflective layer. The ridged surface has an opposite surface opposite the ridged surface. The second face of each of said ridges allows optical communication with the opposite surface.

The ridged film may be incorporated into an optical display device. For example, the optical display device includes an optical cell having a cell front with at least one cell region being capable of an optically transmissive mode and an optically nontransmissive mode with reference to the cell front. The optical cell contains an optically active material responsive to an applied electrical field or thermal input such that optical properties of the material are controllably changeable. The ridged reflector is optically coupled to the optical cell. The ridged reflector and the cell optically cooperate such that light entering the display within a nonglancing incident angle range is emitted from the display at an exiting angle range distinct in angular magnitude from the incident angle range and within a preferential viewing cone. The ridged reflector is capable of asymmetrically reflecting incident light such that the preferential viewing cone is angularly offset from glare. The incident angle range and the exiting angle range are measured relative to a normal axis orthogonally extending from a viewing plane substantially parallel to the cell front.

The ridged reflector is adapted to enhance a viewer's perception of the preferential viewing cone by directing (i.e. beam-steering) exiting light into the preferential viewing cone, which is angularly displaced from a glare angle range for enhanced brightness and legibility of the display device. In general, corresponding incident angles differ in angular magnitude from their associated exiting angles such that the exiting angles are angularly displaced from glare by an asynmnetrical reflection of the ridged reflector. An incident angle is associated with a corresponding glare angle of equal magnitude, but of a different direction with reference to the normal axis in accordance with a basic optical law of reflection.

A resultant difference in magnitude between a peak incident angle within the incident angle range and a peak exiting angle within the exiting angle range may result in the reduction of perceived glare; and, hence improved brightness of the display. The peak incident angle represents an incident angle within the incident angle range which has a peak intensity or highest amplitude within the incident angle range. The peak exiting angle represents an exiting angle within the exiting angle range which has a peak intensity or the highest amplitude within the exiting angle range.

The ridged reflector is capable of producing a symmetrical preferential viewing cone or skewed preferential viewing cones. The symmetrical preferential viewing cone is characterized by a generally circular cross section about a normal axis to the viewing plane. In contrast, the skewed viewing cones typically are characterized by generally oval (i.e. elliptical) cross sections about a normal axis to the viewing plane. The skewed preferential viewing cones have selectable shapes which may be tailored to viewer proclivities based upon human factors. The skewed viewing cones are obtained through concavely or convexly curving the first faces to biasedly focus or shape the preferential viewing cone. Furthermore, the first faces may be parabolically concave or parabolically convex to focus the shape of the preferential viewing cone. The skewed viewing cones permit vertical compression of the preferential viewing cone, horizontal expansion of the preferential viewing cone, or other manipulation of the preferential viewing cone.

The reflector features dual-mode operation, an ambient-lighted mode and a back-lighted mode. In the ambient-lighted mode, the reflector allows efficient reflectivity for viewing the display under well-lit conditions. On the other hand, in the back-lighted mode transmissibility is offered via an optical communication path between the back-light and the viewing interface for viewing the display under darker conditions. The light-transmissive second faces enhance the reflectivity to transmissiveness efficiency ratio of the reflector over prior art reflectors that merely have thin light-transmissive reflective coatings to permit back-lighting. While the first faces of the reflector efficiently reflect most of the light incident upon the reflector from the viewing plane, the second faces facilitate light transmission from the backlight, which may approach twenty percent transmissiveness. The total percentage of reflectivity and transmissibility of the ridged reflector of the present invention may exceed one hundred percent, which exceeds many prior art transflectors.

DETAILED DESCRIPTION OF THE PREFERRED EMBODIMENTS

Figure 1:
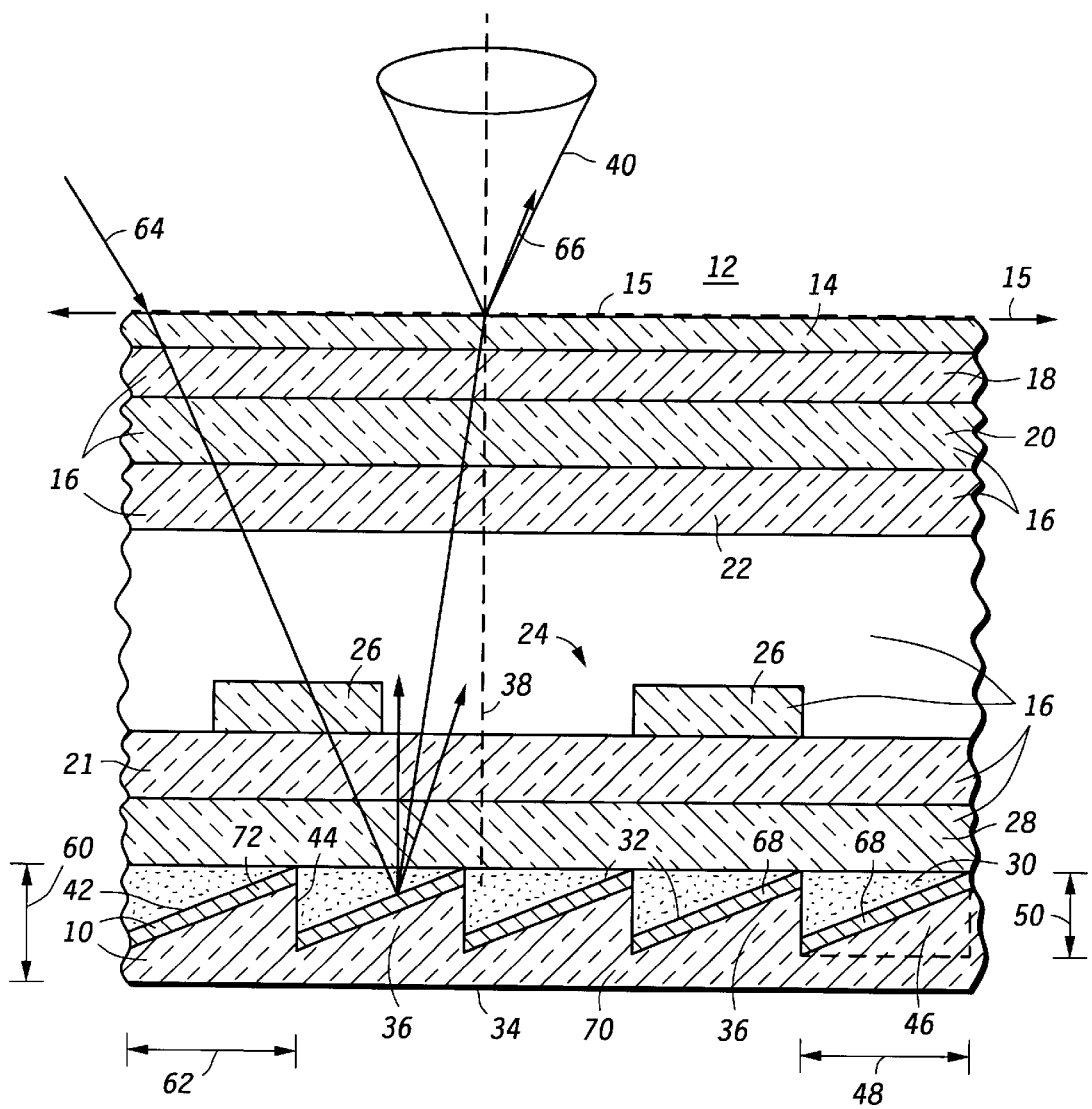
FIG. 1 is a cross-sectional view of a first embodiment of an optical display incorporating the ridged reflector of the present invention.

FIG. 1 shows a ridged reflector 10 incorporated into an optical display device 12, which may operate in a reflective mode via ambient light. While FIG. 1 illustrates a twisted nematic liquid crystal display, the ridged reflector 10 may be incorporated into other types of optical displays, such as liquid crystal displays, guest-host effect liquid crystal displays, polymer dispersed liquid crystal displays, chiral nematic displays, thermally addressable displays, or the like. Illustrative examples of various displays which may use the ridged reflector 10 are described in "Liquid Crystals, Applications and Uses, Bahadur, B., *World Scientific,* 1991, Vol. 1., Ch. 6–11 and Vol. 3, Ch. 19, which is incorporated herein by reference.

The optical display device 12 preferably comprises a viewing interface 14 and a reflector 10 optically coupled to an optical cell 16. The viewing interface 14 may be a lens or a screen which is adapted to receive ambient light. A viewing plane 15 is a mathematical plane which is coextensive with an exterior surface of the physical viewing interface 14.

The optical cell 16 may be, for example, a twisted nematic cell as illustrated in FIG. 1. In general, the optical cell 16 may be any commercially available optical cell or optical panel. The optical cell 16 for a twisted nematic display preferably includes a transparent front plate 20, a front electrode 22, an optically active material 24, one or more rear electrodes 26, a transparent rear plate 21, a front polarizer 18, and a rear polarizer 28. The front plate 20 and the rear plate 21 confine the optically active material 24. The optically active material 24 is a liquid crystal material, an optically anisotropic material, or the like. The front electrode 22 is attached to the front plate 20, while one or more rear electrodes 26 are attached to the rear plate 21. The front electrode 22 and one or more rear electrodes 26 may be made of a thin coating of indium oxide, tin oxide, or indium-tin oxide. The front electrode 22 and the rear electrode 26 are energized with direct current voltage or alternating current voltage to selectively apply an electric field to one or more regions of the optically active material 24.

The optically active material 24 has controllably changeable optical properties in response to the applied electric field. The optically active material 24 and the applied electric field permit an optically transmissive mode and a nontransmissive mode. The optically transmissive mode allows sufficient transmission of light through the optical cell 16 to permit a viewer to distinguish the transmissive mode from the nontransmissive mode. The optically transmissive mode permits the transmission of light through a particular cell region between the cell front and the cell back such that the light transmitted through the cell is perceptible to a viewer. The attenuation of the cell in the transmissive mode is optimally minimized to keep an adequate intensity differential between the transmissive mode and the nontransmissive mode, yielding a sufficiently contrasted, viewable display for a viewer. The optically nontransmissive mode attenuates light by an amount sufficient to significantly reduce the intensity of the light traversing the entire cell region The reduction of the intensity of the nontransmissive mode is optimally maximized to keep an adequate intensity differential between the transmissive mode and the nontransmissive mode.

The front polarizer 18 and the rear polarizer 28 preferably define a cell front and a cell rear, respectively, for a twisted nematic cell. In alternative embodiments, where the front polarizer, the rear polarizer 28, or both are absent, a cell front and a cell rear may be defined by the front plate 20 and the rear plate 21, respectively. In FIG. 1, for dark characters on a bright background, the front polarizer 18 and the rear polarizer 28 have a polarization offset so that optically active material 24 must rotate the polarization of the light in the transmissive mode. Those of ordinary skill in the art appreciate that optical displays other than twisted nematic displays may rely on other optical properties, other than polarization to produce a transmissive mode and a nontransmissive mode. For example, guest-host effect cells with dichroic dye may be implemented with no polarizers. Guest-host cells may use an ordered state in which dye molecules are oriented parallel to a director of a chiral nematic liquid crystal material to facilitate a display.

The ridged reflector 10 is suitably affixed to any type of optical cell 16 such that the reflector is in optical communication with the cell. The ridged reflector 10 is preferably affixed to an optical cell 16 at the cell back via a transparent adhesive 30 as illustrated in FIG. 1. The transparent adhesive may be diffusive. The diffusive characteristics of the transparent adhesive are illustrated in FIG. 1 by the three illustrative light rays above the ridged reflector at slightly different angles. The ridged reflector 10 has a ridged surface 32 of wavelike bumps and an opposite surface 34 opposite the ridged surface 32. Although a first embodiment of the ridged reflector 10 is shown in FIG. 1, any of the various embodiments of the ridged reflector 10 illustrated in FIG. 3 through FIG. 9 may be incorporated into the optical display.

In an alternate embodiment, the ridged reflector 10 is oriented for optical communication with a cell back of the optical cell 16 and an air-space or a gas-filled gap intervenes between the cell back and the ridged reflector 10.

Figure 2:
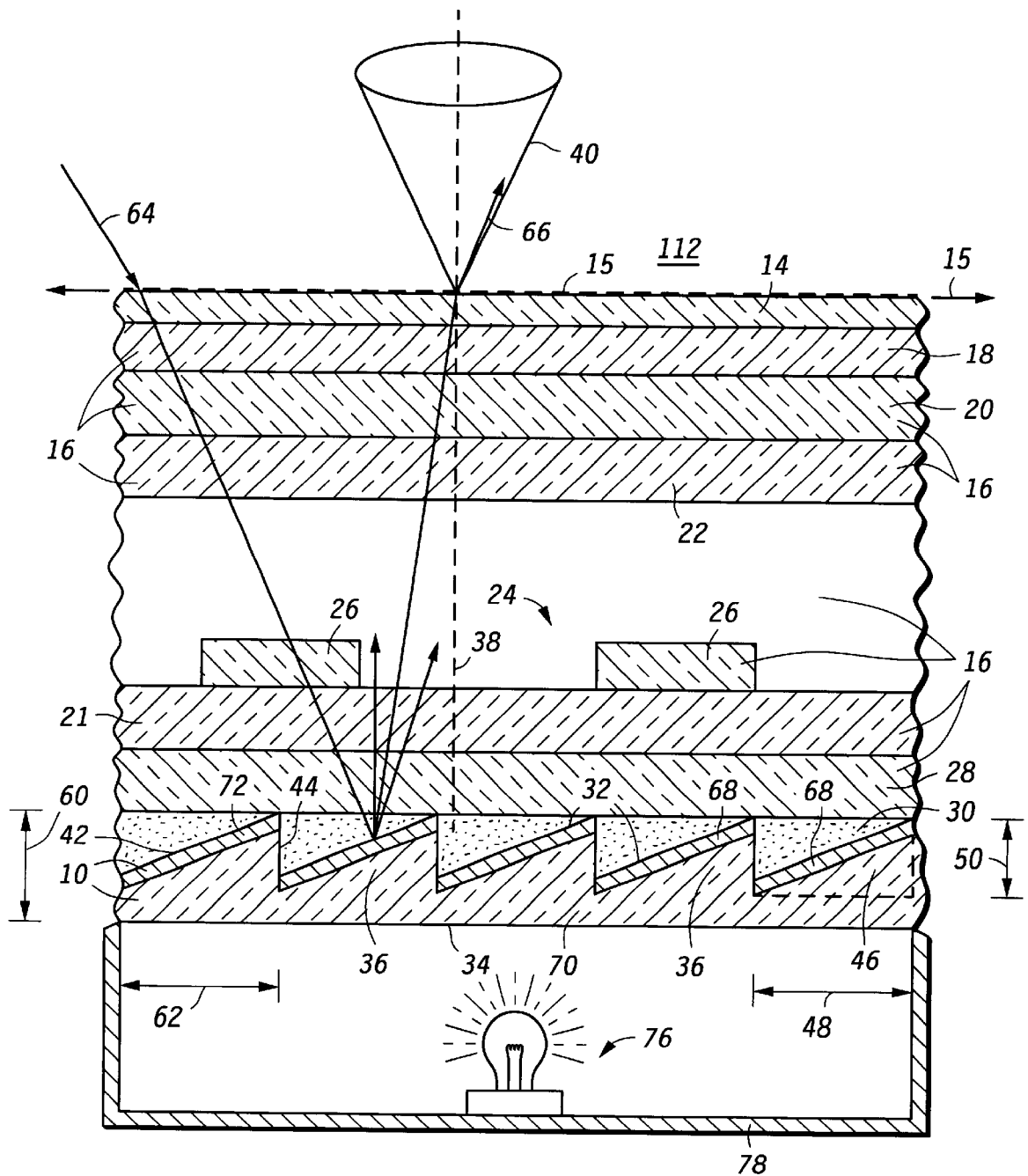
FIG. 2 is a cross-sectional view of a second embodiment of the optical display incorporating the ridged reflector.

FIG. 2 shows an optical display 112 which is comparable to the optical display 12 of FIG. 1, except the optical display 112 of FIG. 2 features a back-light or light source 76. The light source 76 is preferably surrounded by a reflective housing 78 to maximize the efficiency of the light source 76. The back-light 76 is preferably located on the opposite side such that the back-light optically communicates with the optical cell 16 through the adhesive layer of transparent adhesive 30.

In alternate embodiments, diffusers, diffusive film, or diffusive adhesive may be added to the optical displays described herein to improve display performance.

For example, a front asymmetric diffuser could be optically coupled to the front polarizer 18. An asymmetric diffuser is commercially available from Sumitomo Chemical Ltd., Co. of Japan under the trade designation of Lumisty. A standard sheet diffuser film is commercially available from Minnesota, Mining, and Manufacturing (3M) Corporation of Minnesota under the trade designation of Light Diffusing Film or DFA. Conventional diffusive reflectors featured sputtered metal or metallic particles distributed to form a reflective surface.

Figure 3:
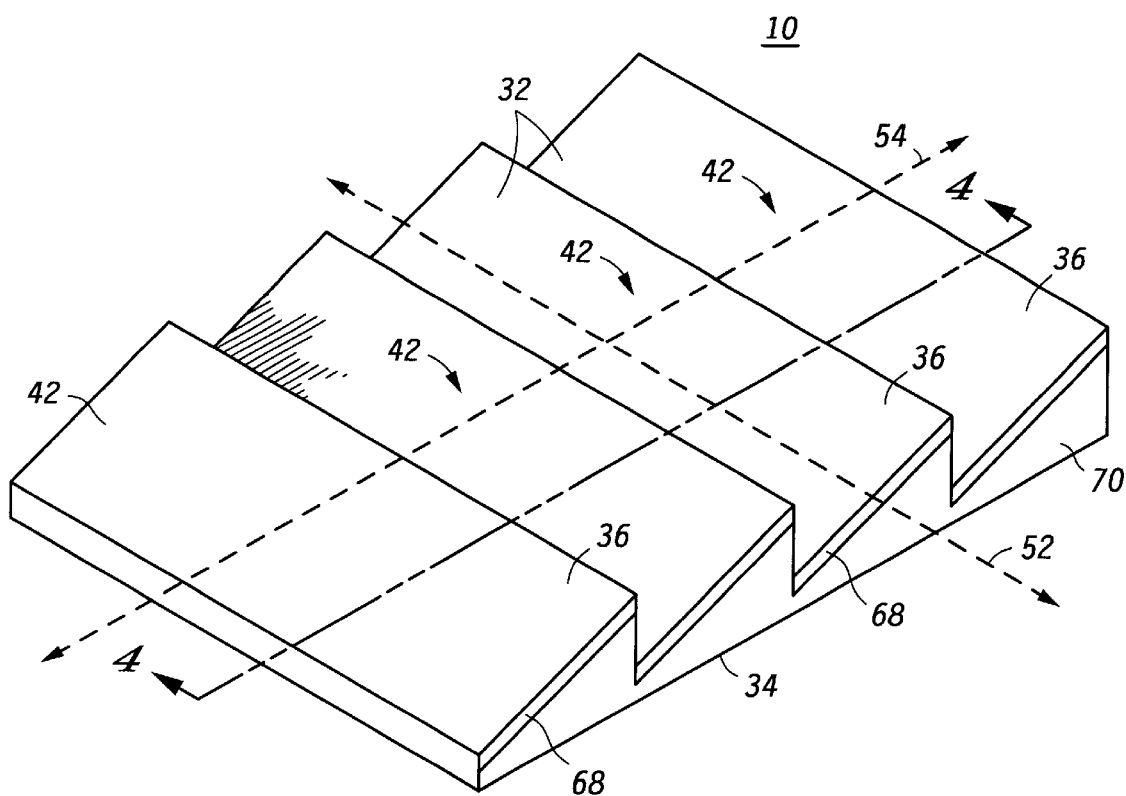
FIG. 3 is a perspective view of a first embodiment of the ridged reflector for use in the optical display.
Figure 4:
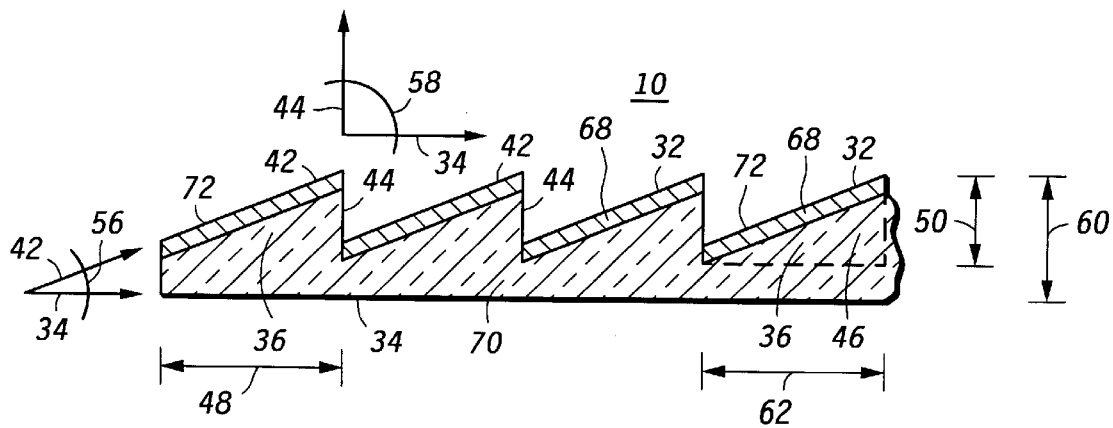
FIG. 4 is a cross-sectional view of the ridged reflector as viewed along reference line 4–4 of FIG. 3.

FIG. 3 and FIG. 4 show a first embodiment of the ridged reflector 10, which was previously shown in the optical display of FIG. 1 and FIG. 2. The ridged reflector 10 has a ridged surface 32 and an opposite surface 34 opposite the ridged surface 32. The opposite surface 34 is preferably substantially planar. The ridged surface 32 comprises a series of ridges 36. The ridged surface 32 is generally wavelike. Each of the ridges 36 has a first face 42 and a second face 44 preferably intersecting the first face 42. The ridged surface 32 is preferably optically coupled to one side of an optical cell 16, while a viewer views the optical cell 16 from another side of the optical cell 16.

The first faces 42 are preferably oriented to reflect light obliquely intercepting the first faces 42 into a preferential viewing cone 40 about a normal axis 38 perpendicular to the opposite surface 34 or the viewing plane 15. The second faces 44 are preferably oriented to minimize any potential reflective interference with the preferential viewing cone 40, based upon the anticipated illumination angle of light incident upon the viewing interface 14. The second faces 44 are generally light-transmissive and substantially free of a reflective layer or metallic film.

The first faces 42 biasedly focus reflected light into the preferential viewing cone 40, which is optimally oriented away from glare and an associated range of glare angles. The biasedly focusing of light refers to the predisposition or tendency of reflected light to be redirected into a preferential viewing cone 40. The biasedly focused light may have diagonal propagation directions relative to the normal axis 38. However, the biasedly focused light may have propagation directions that are parallel to or coincident with the normal axis 38.

The first faces 42 are preferably generally parallel to each other such that the first faces 42 generally face toward first directions, while the second faces 44 generally face toward second directions distinct from the first directions. The first faces 42 have first normals generally directed toward the first directions, while the second faces 44 have second normals generally directed toward the second directions. The corresponding first normals of adjacent ones of the first faces 42 are preferably substantially parallel to one another.

As shown, each ridge 36 has a generally triangular cross-section characterized by a base 48 and a height 50. Each ridge 36 has a longitudinal axis 52 that is oriented perpendicularly to the triangular cross-section and its cross-sectional axis 54. The first face 42 has a first slope defining a first angle 56 with respect to a plane substantially parallel to the opposite surface 34 or a viewing plane 15. The first angle 56 may range from 10 degrees to 60 degrees. The first angle 56 optimally has a range from approximately 15 to 25 degrees to reflect light interacting with the first face 42 into the preferential viewing cone 40 about a normal axis 38 perpendicular to the viewing plane 15. The light in the preferential viewing cone 40 is called exiting light 66 and falls within an exiting angle range. The exiting light 66 has an exiting angle relative to the viewing plane 15 which is distinct from the incident angle relative to the viewing plane 15, resulting in the reduction of perceived glare by a viewer. A reduction in the perceived glare means that the preferential viewing cone is angularly displaced from glare, even if a glare amplitude profile over a glare angle range remains constant despite the influence of the ridged reflector. The peak incident angle represents an incident angle within the incident angle range which has a peak intensity or highest amplitude within an amplitude profile of the incident angle range. The peak exiting angle represents an exiting angle within the exiting angle range which has a peak intensity or the highest amplitude within an amplitude profile of the exiting angle range. The orientation of the first face 42 facilitates the difference in the exiting angle relative to a corresponding associated incident angle, and the associated difference in the exiting angle range relative to the incident angle range.

The first angle 56 may be established to correspond to an illumination angle. The illumination angle falls within an illumination range of peak intensities that incident light 64 makes with respect to the viewing plane 15. The illumination range has a geometric center and an amplitude profile. The amplitude profile contains a peak or highest amplitude. The peak amplitude may coincide with the geometric center, but need not coincide with the geometric center. As used herein, centered shall refer to a light ray coextensive with the geometric center of the illumination range, the preferential viewing cone, the glare range, the exiting angle range, or the like. The illumination angle takes into account a viewer's tendency to orient the optical display for optimal viewing. The illumination angle typically ranges from twenty five to forty degrees, with respect to a normal axis 38 extending perpendicularly from the viewing plane 15, based upon displays used with overhead indoor lighting or outdoors.

The relationship between the illumination angle and the first angle 56 is best understood by reference to the following examples. In a first example, if the illumination range is centered at thirty degrees, if the preferential viewing cone is centered at zero degrees, and if the ridged reflector 10 is bounded by an adhesive interface with an index of refraction approximately equal to 1.5, then the first angle 56 is optimally ten degrees. In another example, if the illumination range is centered at thirty degrees, if the viewing cone is centered at zero degrees, and if the ridged reflector 10 is bounded by an air interface, then the first angle 56 is optimally fifteen degrees. In yet another example, if the illumination range is centered at forty degrees, if the viewing cone is centered at negative ten degrees and if the ridged reflector 10 is bounded by an air interface, the first angle 56 is optimally twenty five degrees.

The second face 44 has a second slope defining a second angle 58 with a plane substantially parallel to the opposite surface 34 or the viewing plane 15. In this embodiment, the first slope and the second slope are preferably substantially uniform throughout the cross-section of each of said ridges 36. The second angle 58 is preferably limited by the illumination angle of incident light 64 upon the viewing interface 14, such that after internal refractive bending intermediately between the reflector 10 and the viewing interface 14 within an optical display, the propagational direction of the incident light 64 entering the optical display is substantially parallel to the second face 44, glancing to the second face 44, or not substantially reflectively interactive with the second face 44. Although the second angle 58 is illustrated as 90 degrees, the second angle 58 preferably may range from 45 degrees to 135 degrees to minimize reflective interactions of the incident light 64 and the second face 44. The first angle 56 is acute and the second angle 58 is preferably at least ninety degrees when measured from the same rotational direction from a plane parallel to the opposite surface 34. In alternate embodiments, the first angle and the second angle may have different magnitudes than previously described herein.

FIG. 3 and FIG. 4 illustrate a first embodiment of the ridged reflector 10 that produces a generally conical viewing cone with generally circular cross section in response to light incident upon the ridged reflector 10. The conical viewing cone achieves a conical shape because of the diffusive means for diffusing light within the display (i.e. transparent adhesive 30) and ambient light sources which tend to be somewhat directional. Certain directional light sources may be modeled as having conical propagation radiation patterns, further contributing to a conical shape of the preferential viewing cone. The first faces 42 in FIG. 3 through FIG. 4 have rectilinear or constant slopes which contribute toward forming a symmetrical preferential viewing cone 40 if the reflector 10 is incorporated into an optical display.

The ridged reflector 10 has a maximum thickness 60 defined by the distance between a peak of a ridge and the opposite surface 34. The ridges 36 have a peak-to-peak spacing between adjacent peaks which is called the pitch 62 of the ridged surface 32. The pitch 62 may affect the coupling of the back-light through the ridged reflector 10. In a preferred embodiment, a linear dimension (i.e. pitch) of each first face 42 is equal to or less than a linear breadth of a corresponding pixel of the display to maximize the brightness uniformity of adjacent and/or nearby same-state pixels. As a whole, if the linear dimensions of individual first faces 42 individually exceed the corresponding linear breadths of the individual pixels, the display may appear as if the display is not uniformly illuminated, even if it actually is.

An illustrative example of the ridged reflector, which may be used to practice the present invention, has a triangular cross section 46 defined by a typical base dimension of 200 microns, a typical height of 75 microns, a typical maximum thickness of 150 microns, a first angle 56 of approximately 15 degrees, and a second angle 58 of approximately 90 degrees. The ridged reflector preferably has a height 50 within a range from approximately 60 to 100 microns. The ridges 236 optimally adjoin one another in the illustrative example. The pitch 62 density and pixel density may, for example, range from five to ten per millimeter. If magnified sufficiently, the ridges 236 preferably are arranged to give the ridged surface 32 a jagged profile which resembles the profile of lapped siding on a house. The ridged reflector is not limited to any particular height, base, maximum thickness, pitch, dimensions, or angular measures regardless of the illustrative example of the ridged reflector disclosed herein. Other dimensions and angular measures, which are different from the dimensions and angular measures of the illustrative examples set forth herein, may be used to practice the invention so long as the dimensions and angular measures are consistent with the general teachings of the invention.

The ridged reflector 10 has a reflective metallic layer 68 that partially overlies a transparent polymeric base layer 70. In particular, the first faces 42 are covered with a reflective metallic layer 68, while the second faces 44 are substantially free of the reflective metallic layer 68. The second faces 44 are generally light-transmissive allowing optical communication with the opposite side via the second face 44, or vice versa. Accordingly, the reflective metallic layer 68 may be considered discontinuous or the reflective metallic layer 68 may be characterized as including a series of reflective plates 72. The second face 44 preferably may be oriented to minimize total internal reflections at the second face-adjoining region interface, so long as the resultant orientation of the second face 44 is consistent with minimizing reflective interactions with incident light 64 as previously described. For example, the second face 44 may have a second angle of less than or equal to ninety degrees relative to a plane oriented parallel to the opposite surface 34 to minimize total internal reflections of the back-lighting. The second angle 58 is measured in the same rotational direction with respect to the plane as the first acute angle 56.

The transparent polymeric base layer 70 comprises a light transmissive layer. The transmissive layer is preferably substantially transparent to white humanly visible light. In an alternate embodiment, the transmissive layer is substantially transparent to a humanly visible light of a selected color, shade, and/or tint. The transmissive layer may contain a dye selected from the group consisting of optically-active dyes, tints, and dichroic dyes to be transparent to visible light of a selected color, shade, and/or tint. Such a transmissive layer forms an optically frequency selective filter.

The transparent polymeric base layer 70 is preferably composed of a polymer selected from the group consisting of acrylate resin, polyester resin, polycarbonate, epoxy resin, a thermoplastic, or the like. Polyester resin is preferred for its adhesion characteristics with plated metal films. The reflective metallic layer 68 may comprise a metal film or polymeric adhesive film containing metallic particles. The reflective metallic layer 68 may be applied by spraying, sputtering, evaporating, depositing, plating, or electrolessly plating the polymeric base layer 70 with a reflective metal, such as silver, aluminum, nickel, chromium, copper, or alloys of the foregoing metals. Evaporating metal and selective plating are preferred techniques for manufacturing a ridged reflector in which the first faces 42 are metallized and the second faces 44 are not metallized. Sputtering metal is preferred for enhancing the diffusive properties of the ridged reflector. Silver-metal alloys, nickel-metal alloys, and aluminum-metal alloys are illustrative examples of reflective alloys. However, alloys are generally more difficult to plate than pure metals because of potentially conflicting process control conditions.

In an alternate embodiment, the reflective metallic layer is sufficiently thin such that the reflective metallic layer is so discontinuous as to permit partial light transmission between the ridged surface 32 and the opposite surface 34. In practice, if the reflective metallic layer 68 is thinner than or equal to approximately 800 angstrom units, the reflective metallic layer 68 will become discontinuous and; hence, light transmissive.

In still another alternate embodiment, different first faces are angularly offset or slightly tilted with respect to one another so the aggregate group of first faces has a common focal point. The first faces may be tilted toward a common focal point such that the tilts or the first cross-sectional slopes of the first faces vary along the cross-sectional axis 54 and/or the longitudinal axis 52. The first faces appear to have different first cross-sectional slopes, even if the same first cross-sectional slope is merely tilted with respect to adjacent first faces. The angular offset is well-suited for providing uniform brightness and perceived uniform illumination of large displays. Large displays may be defined as displays in which the preferential viewing angle changes over the viewing plane 15 of the viewing interface 14, such as a screen, display face, or lens.

While the preferential viewing cone 40 is normally referenced about a normal perpendicular to the opposite surface 34 or the viewing plane 15, the preferential viewing cone 40 may be tilted with respect to the viewing plane 15. The tilting of the viewing cone is accomplished by tilting the first faces toward a displaced common focal point, which is displaced from a reference focal point. The reference focal point is bisected by a normal axis 38 perpendicular to the viewing plane 15.

Prior to deposition of the reflective metallic layer 68, the polymeric layer is preferably etched to produce microporosity on the surface to improve adhesion between the polymeric layer and the reflective metallic layer 68. When the reflective metallic layer 68 is deposited, the reflective metallic layer 68 fills the micro-pores, resulting in an interlocking bond. The appropriate etch solution required varies with the particular polymer comprising the polymeric layer. A solution of sulfuric acid, potassium dichromate, and water may be used as an etch solution for some polymers.

An alternative method for preparing the polymeric layer for plating includes treating the first faces with a catalytic plating conditioner dispersed in a polymeric coating. The polymeric coating forms a thin catalytic film overlying the polymeric layer. While the first faces may be treated with a catalytic plating conditioner to facilitate the formation of the reflective metallic layer, the second faces may be configured to be resistive to metallic plating. The catalytic plating conditioner may comprise metal oxide particles. Any solvent-induced or thermally-induced incidental contamination of metal oxide particles in the polymeric layer must not substantially attenuate light transmitted through the transparent polymeric base layer.

FIG. 5 through FIG. 9 illustrate embodiments of the ridged reflector that produce generally semi-conical viewing cones with generally oval (i.e. elliptical) cross sections parallel to the opposite surface. The oval cross section of the preferential viewing cone may be elongated along a major axis and diminished along a minor axis, which is generally oriented perpendicularly to the major axis. The selectable shapes of the preferential viewing cone may be skewed or asymmetrical in the sense that a cross section of the preferential viewing cone has a major axis that is preferably longer than a minor axis. The minor axis represents the minimal dimension of the cross section while the major axis represents the maximum dimension of the cross section of the preferential viewing cone. The elongation of the cross section and any desired tilt of the viewing cone from the normal axis may be accomplished independently or together in accordance with the scope of the present invention.

Figure 5:
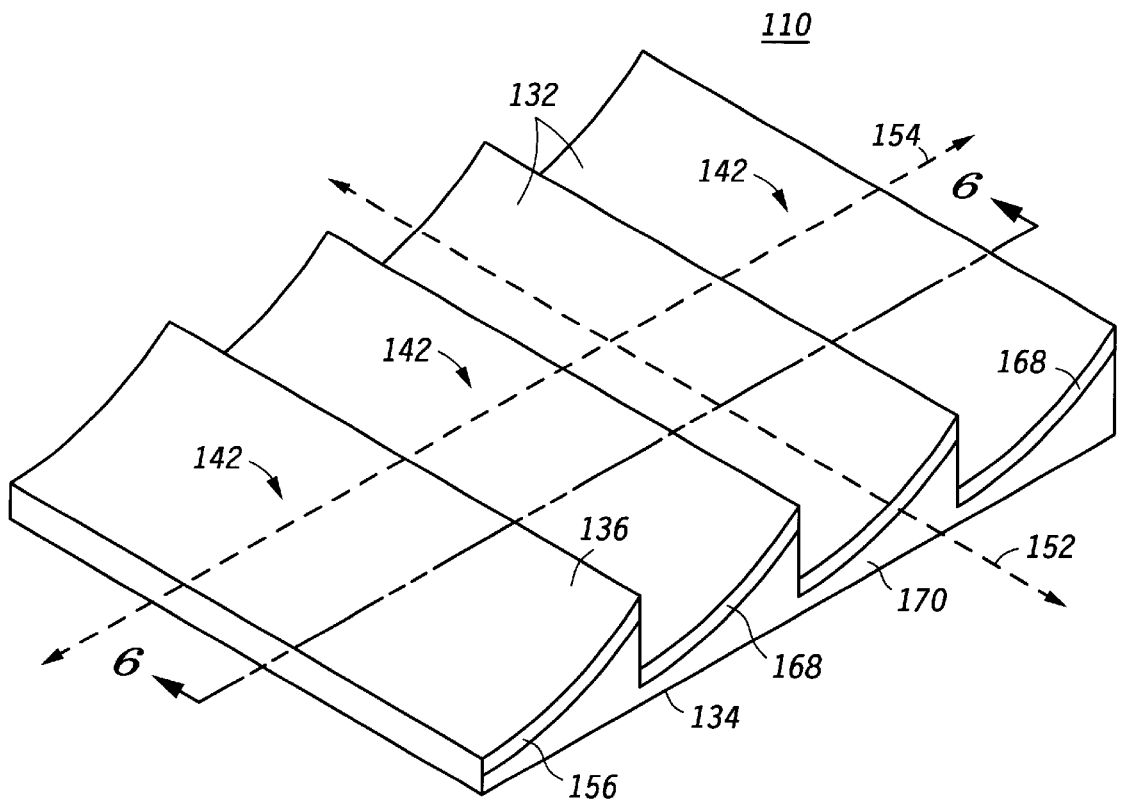
FIG. 5 is a cross-sectional view of a second embodiment of a ridged reflector.
Figure 6:
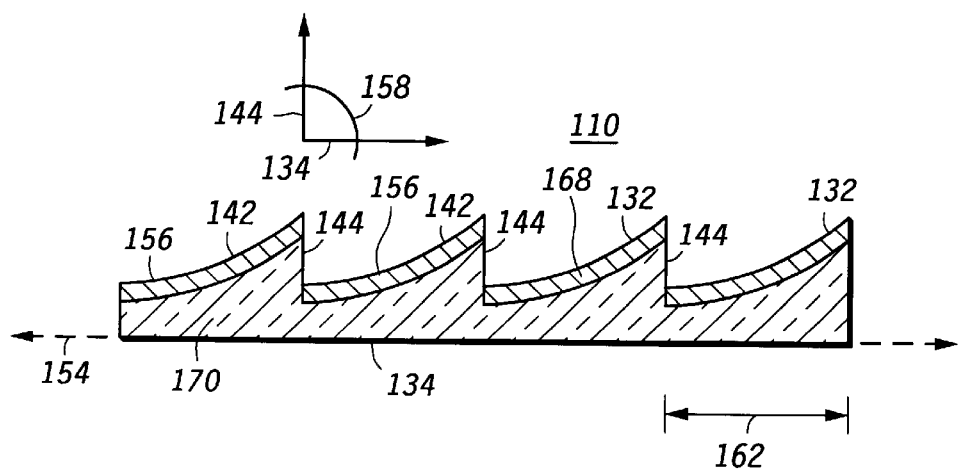
FIG. 6 is a cross-sectional view of the ridged reflector as viewed along reference line 6—6 of FIG. 5.

FIG. 5 and FIG. 6 illustrate a second embodiment of a ridged reflector 110. The ridged reflector 110 has first faces 142 that are concavely curved to produce a semi-conical viewing cone with a generally oval (i.e. elliptical) cross section, parallel to the viewing plane. The first face 142 of each ridge is concavely curved along the cross-sectional axis 154 of the ridges 136. If the cross-sectional slope or curvature 156 of the first face 142 is concavely curved, the viewing cone may be vertically compressed, so long as the cross-sectional axis 154 of the ridges 136 is parallel with or coincident with the vertical axis of the viewing plane. The vertical axis is vertical relative to a viewer's perspective, if the display is oriented as appropriately intended for viewing.

The ridged reflector 110 includes a ridged surface 132 of wavelike protrusions or ridges 136. Peaks of adjacent ridges 136 are separated by a pitch 162, which is preferably commensurate with the pixel size so that adjacent and nearby same-state, active pixels may be uniformly bright. The ridged reflector 110 has a reflective metallic layer 168 that partially overlies a transparent polymeric base layer 170. In particular, the first faces 142 are covered with a reflective metallic layer 168, while the second faces 144 are generally light-transmissive and substantially free of a reflective layer or metallic film. The second faces 144 are in optical communication with the opposite side via the second face 144, or vice versa. Accordingly, the reflective metallic layer 168 may be considered discontinuous or the reflective metallic layer 168 may be characterized as including a series of curved reflective members separated from one another by the second faces 144.

The second face 144 may be oriented to minimize total internal reflections at the second face-adjoining region interface consistent with minimizing reflective interactions between the incident light entering the display and the second face 144. For example, the second face 144 preferably has an angle 158 of less than or equal to ninety degrees relative to a plane oriented parallel to the opposite surface 134 to minimize total internal reflections.

Each of the first faces 142 has a curvature 156 which is a curved cross section of a ridge 136. The curvature 156 has a degree of concavity. The curvature 156 is selected to produce a displacement of the preferential viewing cone from glare similar to the first illustrative embodiment of the ridged reflector 10. The curvature 156 preferably may be approximated by a series of end-to-end line segments in which at least one of the line segments tracks or does not substantially deviate from the first angle of the first embodiment of the ridged reflector 10.

The first faces 142 are preferably substantially parallel to each other. The first faces 142 generally face toward first directions, while the second faces generally face toward second directions distinct from the first directions. The first faces 142 have first normals tangential to the curvature 156. The first normals are generally directed toward the first directions, while the second faces 144 have second normals generally directed toward the second directions. The first normals may coincide with or pass through focal points of the first faces 142. The corresponding first normals of adjacent ones of the first faces 142 are preferably substantially parallel to one another.

The degree of concavity of the first face 142 may be selected such that a desired percentage of the incident light illuminating the opposite surface 134 is transmitted through the transmissive layer. The desired percentage of the incident light shall apply to white light or a selected optical frequency of operation. The ridged reflector may be characterized by an energy ratio representing a proportion of emerging light from the second faces 144 to incident light illuminating the opposite surface 134. The energy ratio may be defined as the light intensity per unit area intercepting a plane above the ridged surface divided by the light intensity per unit area of the opposite surface 134. The intercepted plane is substantially parallel to the opposite surface 134. The first face 142 preferably has a degree of concavity arranged to convey light emerging from the second face 144 such that an energy ratio is at least ten percent.

The incident light illuminating the opposite surface 134 may comprise an incandescent back-light, a fluorescent back-light, an electroluminescent back-light, a light-emitting diode, a back-light, a halogen lamp, a lamp, a light source, or the like. The maximum degree of concavity must be balanced between providing increased transmission of back-light versus providing an appropriately shaped preferential viewing cone, without unwanted skewing. The maximum degree of concavity may be measured from a maximum dimensional difference between an imaginary flat, rectilinear first face (in accordance with the first embodiment of the ridged reflector 10) and the actual concavely curvature 156 of the first face 142 (in accordance with the second embodiment of the ridged reflector 110). If the maximum dimensional difference; and hence, the maximum degree of concavity exceeds a predetermined limit, the preferential viewing cone may be extremely expanded in one dimension or extremely compressed in another dimension so that a viewer will have difficulty viewing the display. The difficulty in viewing an extremely compressed display is first finding the preferential viewing cone and secondly maintaining appropriate alignment with the display to remain within the preferential viewing cone.

In an alternate embodiment, the degree of concavity is selected such that approximately ten to twenty percent of incident light illuminating the opposite surface 134 is transmitted through the transparent polymeric base layer 170. Thus, the alternate ridged reflector may be characterized by an energy ratio of approximately ten to twenty percent.

In yet another alternate embodiment, the first face is concavely and parabolically curved such that a cross-sectional slope or curvature of the first face varies parabolically throughout each of the ridges. The parabolic curvature allows additional focusing and tailoring of the preferential viewing cone; especially if adjacent first faces are offset slightly so the aggregate group of first faces has a common focal point.

In still another alternate embodiment, different first faces are angularly offset or slightly tilted with respect to one another so the aggregate group of first faces has a common focal point. The first faces may be tilted toward a common focal point such that the tilts or the first cross-sectional slopes of the first faces vary along the cross-sectional axis 154 and/or the longitudinal axis 152. The first faces appear to have different first cross-sectional slopes, even if the same first cross-sectional slope is merely tilted with respect to adjacent first faces. The angular offset is well-suited for providing uniform illumination of large displays where the viewing angle changes over the viewing plane of the viewing interface, such as a screen, display face, or lens. The common focal point may be displaced to form a displaced common focal point and an accompanying tilted preferential viewing cone, which is tilted from the normal axis 38.

Figure 7:
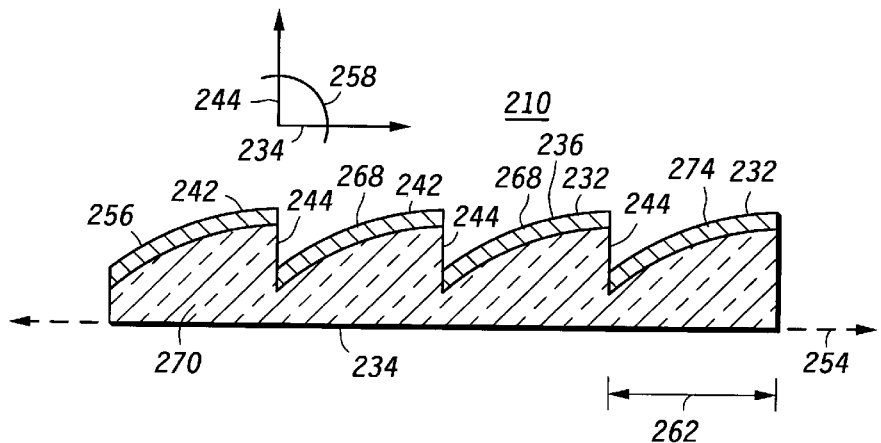
FIG. 7 is a cross-sectional view of a third embodiment of a ridged reflector.

The same manufacturing techniques and considerations that apply to the first embodiment apply to the second embodiment of the ridged reflector FIG. 7 illustrates a third embodiment of the ridged reflector 210 that produces generally conical viewing cones with generally oval (i.e. elliptical) cross sections. The ridged reflector 210 includes a ridged surface 232 of wavelike protrusions and an opposite surface 234 opposite the ridged surface 232. The ridged surface 232 includes a plurality of ridges 236 that are spaced apart from one another by a pitch 262, as measured between the peaks of adjacent ridges 236. The pitch 262 is preferably commensurately sized with respect to corresponding pixels of a display to facilitate uniform brightness between adjacent and nearby active pixels. Accordingly, the linear dimension of each of the first faces 242 preferably is less than or equal to the linear breadth of a corresponding pixel that cooperates with the respective reflective first face 242 upon illumination of the display.

The ridged reflector 210 comprises a reflective metallic layer 268 that partially overlies a transparent polymeric base 270 such that the transparent polymeric base 270 is capable of transmitting light between the ridged surface 232 and the opposite surface 234. The first faces 242 of the ridged reflector 210 are preferably coated or metallized with the reflective metallic layer, while the second faces 244 are not covered by the reflective metallic layer 268. The second faces 244 are generally light-transmissive and substantially free of the reflective metallic layer 268.

The first faces 242 in FIG. 7 have curvatures 256 which contribute toward forming an asymmetrical preferential viewing cone once the reflector is incorporated into an optical display. The curvatures 256 of the first faces 242 are convexly curved slopes. The curvature 256 is selected to produce a desired displacement of the preferential viewing cone from glare based upon an incident angle range and in accordance with the first illustrative embodiment of the ridged reflector 10. The curvature 256 preferably may be approximated by a series of line segments in which at least one of the line segments tracks or does not substantially deviate from the first angle of the first embodiment of the ridged reflector 10.

The first face 242 is convexly sloped along the cross-sectional axis 254 of the ridges 236. If the cross-sectional axis 254 is parallel to or coincident with the horizontal axis of the viewing plane, the preferential viewing cone of the third embodiment of the reflector may be horizontally expanded.

The second faces have an angle 258 or a second curvature relative to a plane parallel to the opposite surface 234. The angle 258 of the second face is oriented to minimize total internal reflections at a polymeric base-adjoining region interface such that back-lighting transmissiveness of the ridged reflector 210 meets or exceeds ten percent transmissiveness. The adjoining region may contain a transparent adhesive for attaching the ridged reflector 210 to a display.

In an alternate embodiment, the first face is convexly and parabolically curved such that a curvature or a cross-sectional slope of the first face varies parabolically throughout each of the ridges.

In yet another embodiment, the first faces with approximately identical curvatures are convexly and parabolically curved at different tilts to cooperate to form a common focal point within the preferential viewing cone.

Figure 8:
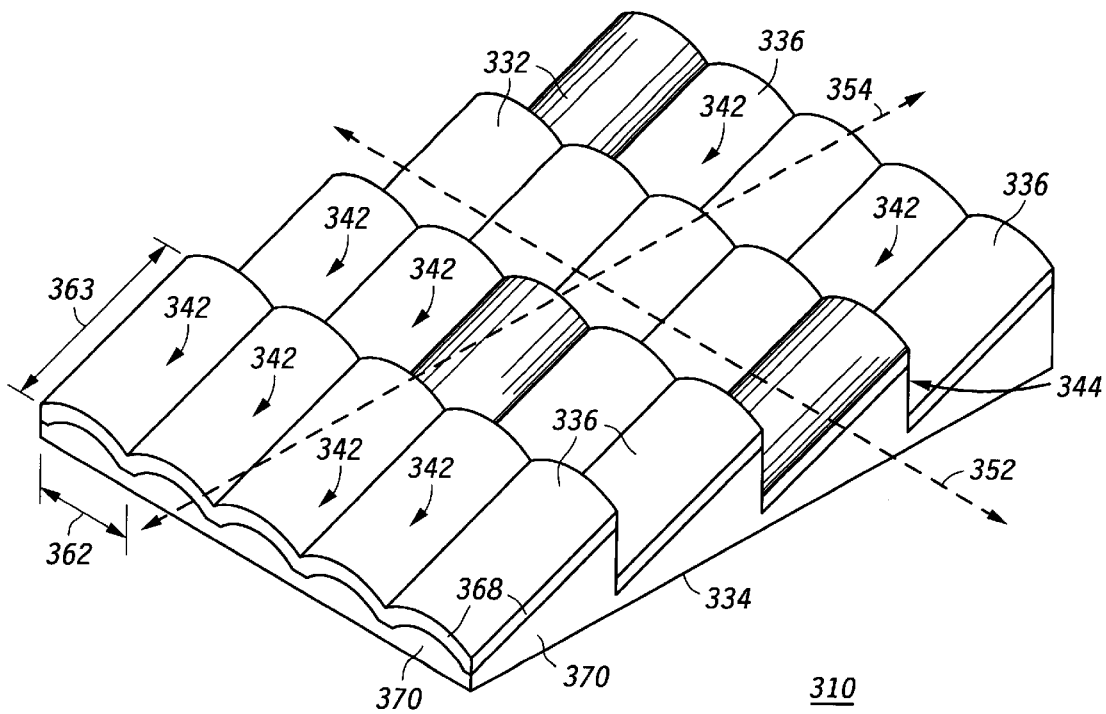
FIG. 8 is a perspective view of fourth embodiment of a ridged reflector.

FIG. 8 illustrates a fourth embodiment of the ridged reflector 310 in which the first face 342 is convexly sloped along the longitudinal axis 352 of the ridges 336. in the fourth embodiment of the ridged reflector 310, the viewing cone may be horizontally expanded, so long as the longitudinal axis 352 is parallel to or coincident with the horizontal axis of the viewing plane. The horizontal axis is horizontal relative to a viewer's perspective.

The ridged reflector 310 has a ridged surface 332 and an opposite surface 334, which is opposite from the ridged surface 332. The ridges 336 have a cross-sectional pitch 363 along the cross-sectional axis 354. The cross-sectional pitch 363 is approximately equal to the distance between adjacent peaks of adjacent ridges 336. The ridges 336 have a longitudinal pitch 362 along the longitudinal axis 352. The longitudinal pitch 362 is approximately equal to the distance between adjacent valleys bordering each ridge 336.

The ridged reflector 310 preferably features a transparent polymeric base 370 in which only the first faces 342 are predominately or entirely covered with a reflective metallic layer 368, as previously described in conjunction with other illustrative embodiments herein. The second faces 344 of the ridged reflector 310 are not covered with the reflective metallic layer 368, but are left exposed to transmit any back-lighting illuminating the opposite surface 334. The second faces 344 are generally light-transmissive and substantially free of the reflective metallic layer 368.

Figure 9:
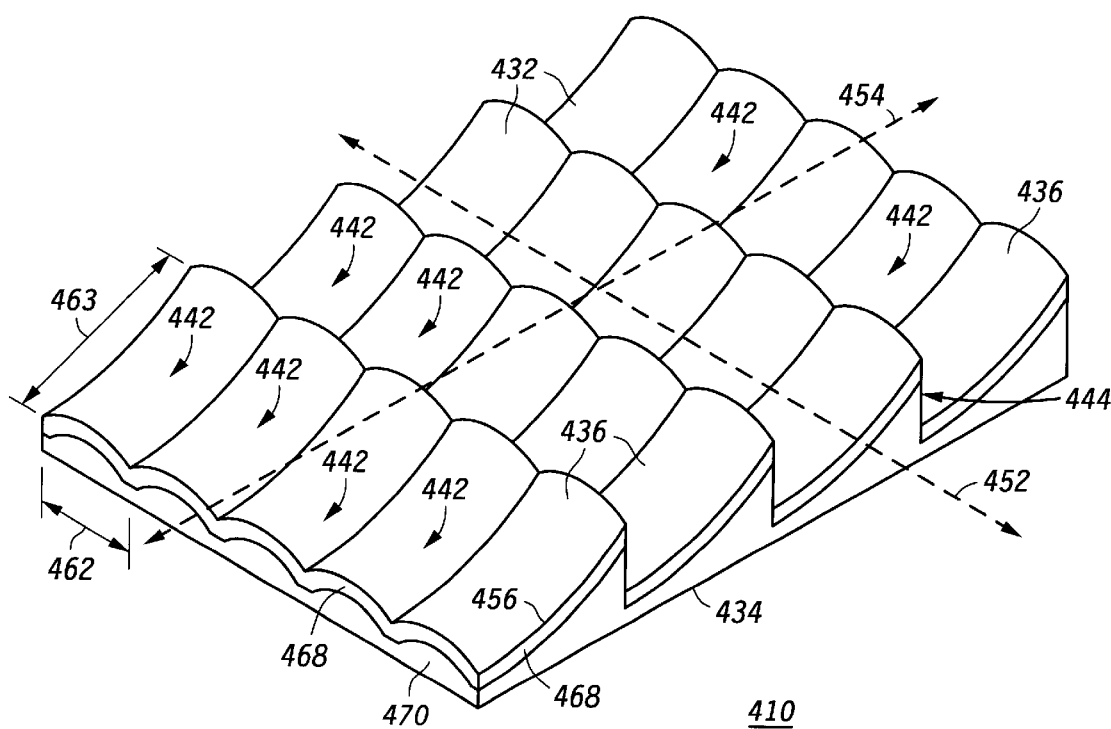
FIG. 9 is a perspective view of a fifth embodiment of a ridged reflector.

FIG. 9 illustrates a fifth embodiment of the ridged reflector 410 in which the first face 442 is both concavely and convexly sloped. The combination of the concave and convex slope may be referred to as a complex curvature 456 of the first faces 442. The complex curvature 456 is selected to produce a desired displacement of the preferential viewing cone from glare based upon an incident angle range and in accordance with the first illustrative embodiment of the ridged reflector 10. The concave slope preferably may be approximated by a series of line segments in which at least one of the line segments tracks or does not substantially deviate from the first angle of the first embodiment of the ridged reflector 10.

Convexly sloping the first face 442 along the longitudinal axis while concavely sloping the first face 442 along a cross-sectional axis 454, which is orthogonal to the longitudinal axis, yields a viewing cone which is simultaneously horizontally expanded and vertically compressed.

The ridged reflector 410 preferably has a ridged surface 432 and an opposite surface 434, which is opposite from the ridged surface 432. The ridges 436 have a cross-sectional pitch 463 along the cross-sectional axis 454. The cross-sectional pitch 463 is approximately equal to the distance between adjacent peaks of adjacent ridges 436. The ridges 436 have a longitudinal pitch 462 along the longitudinal axis 452. The longitudinal pitch 462 is approximately equal to the distance between adjacent valleys bordering each ridge 436.

The ridged reflector 410 may feature a transparent polymeric base 470 in which only the first faces 442 are predominately or entirely covered with a reflective metallic layer 468, as previously described in conjunction with other illustrative embodiments herein. The second faces 444 of the ridged reflector 410 are not covered with the reflective metallic layer 468, but are left exposed to transmit any back-lighting illuminating the opposite surface 434. The second faces 444 are generally light-transmissive and substantially free of the reflective metallic layer 468.

In yet another alternate embodiment, the second face is concave and has an undercut appearance (i e. a curved notch, an arched notch, or a semi-elliptical notch) to reduce the refractive, reflective, and optical activity of the second face which may distort the desired radiation pattern of the preferential viewing cone.

In any of the embodiments of the ridged reflector, the transparent polymeric base comprises the optically transmissive layer with exposed second faces that provide a light-transmissive path for back-lighting, while not detracting from the reflectivity of the first faces. A reflective metallic layer optimally overlies the first faces to maximize reflectivity. Dye may be added to the optically transmissive layer to make it frequency selective to the back-lighting. To increase the back-lighting transmissiveness of the display, the first faces are preferably concavely curved to an extent which does not detract from the desired radiation pattern of the preferential viewing cone and the associated displacement of the preferential viewing cone from glare. The back-lighting transmissiveness of the display is further increased by covering the first faces with a metallic reflective layer that is so thin as to be light transmissive for commercially available back-lights associated with a display device.

In various embodiments the first face may be convexly or concavely curved or sloped along the cross-sectional axis of the ridges to manipulate the shape and scope of the preferential viewing cone as desired for improved visibility of the display. The convex and concave slopes may be parabolic for further manipulation of the preferential viewing cone. In general, the preferential viewing cone may be manipulated to change the circular cross section of the preferential viewing cone to an oval (i.e. elliptical) cross section, which is usually parallel to the viewing plane. The oval cross section has a major and a minor axis, which are perpendicular to one another. The minor axis represents a diminished viewing breadth of the preferential viewing cone, while the major axis represents an enhanced viewing breadth of the preferential viewing cone. The minor axis and the major axis may be rotated about the normal axis to the viewing plane to a fixed orientation as desired for any particular optical display.

Various illustrative embodiments of the ridged reflector and the display incorporating the ridged reflector have been described in this specification. Additional variations in the embodiments and processes described above may be apparent from this specification. Accordingly, the scope of the present invention is defined by reference to the following claims which are further exemplary of the present invention.

We claim:

1. An optical display device adapted for ambient illumination comprising:

an electro-optic panel having a cell front, a cell rear opposite the cell front and at least one region having a transmissive mode, such that light traverses the electro-optic panel between the cell front and the cell rear;

a ridged reflector optically coupled to the cell rear to receive light traversing the electro-optic panel and to reflect the light through the region, said ridged reflector comprising a transparent layer having a ridged surface facing the electro-optic panel and including a first face and a second face, a metallic film coating the first face, the second face being substantially free of the metallic film and generally light-transmissive relative to the transparent layer.

2. The electro-optic display device according to claim 1 wherein the ridged surface comprises a plurality of ridges.

3. The electro-optic display device according to claim 1 wherein the first face is directed toward at least a first direction, effective to reflect light through the region, and; wherein the second face is directed toward at least a second direction distinct from the first direction.

4. The electro-optic display device according to claim 3 wherein the first face is curved to focus reflected light into a preferential viewing cone.

5. The electro-optic display device according to claim 1 wherein the metallic film discontinuously coats the first face.

6. The electro-optic display device according to claim 1 wherein panel is a liquid crystal panel.

7. An optical display device comprising:

an optical cell having a cell front with at least one cell region being capable of an optically transmissive mode and an optically nontransmissive mode with reference to the cell front, the optical cell containing an optically active material responsive to an applied electrical field such that optical properties of the material are controllably changeable;

a ridged reflector including a ridged surface optically coupled to the optical cell and including an opposite surface opposite the ridged surface, the ridged surface comprising a series of ridges, each of said ridges having a first face and a second face; the first face oriented to reflect light obliquely intercepting the first face, the second face oriented to permit optical communication between the optical cell and the opposite surface; the ridged reflector and the cell optically cooperating such that light entering a display within a nonglancing incident angle range is emitted from the display at an exiting angle range distinct in angular magnitude from the incident angle range and within a preferential viewing cone, the incident angle range and the exiting angle range measured relative to a normal axis orthogonally extending from a viewing plane substantially parallel to the cell front.

8. The optical display device according to claim 7 wherein the ridges are adjacent to each other; and wherein the nonglancing incident angle range contains a peak incident angle of a highest amplitude within the incident angle range and wherein the exiting angle contains a peak exiting angle of a highest amplitude within the exiting angle range, the peak incident angle being angularly offset from the peak exiting angle and a glare angle.

9. The optical display device according to claim 7 wherein the first face is substantially rectilinearly sloped and wherein the preferential viewing cone has a generally circular cross section oriented substantially parallel to the viewing plane.

10. The optical display according to claim 7 wherein the first face is concavely curved.

11. The optical display according to claim 7 wherein the first face is concavely curved along a cross-sectional axis of the ridges, and wherein the cross-sectional axis is coincident with or parallel to a vertical viewing axis of the viewing plane such that the preferential viewing cone has a generally oval and vertically compressed cross section.

12. The optical display according to claim 7 wherein the first face is convexly curved.

13. The optical display according to claim 7 wherein the first face is convexly curved along a cross-sectional axis of the ridges, and wherein the cross-sectional axis is coincident with or parallel to a horizontal viewing axis of the viewing plane such that the preferential viewing cone has a generally oval and horizontally expanded cross section.

14. The optical display according to claim 7 wherein the first face is concavely curved along a cross-sectional axis of the ridges and convexly curved along a longitudinal axis of the ridges, the longitudinal axis being perpendicular to the cross-sectional axis, the longitudinal axis oriented coincident with or parallel to a horizontal viewing axis of the viewing plane such that the preferential viewing cone simultaneously is horizontally expanded and vertically compressed.

15. An optical display device comprising:

an optical cell having a cell front with at least one cell region being capable of an optically transmissive mode and an optically nontransmissive node with reference to the cell front, the optical cell containing an optically active material responsive to an applied electrical field such that optical properties of the material are controllably changeable;

a ridged reflector optically coupled to the optical cell;

the ridged reflector including an optically transmissive layer and a reflective layer, said ridged reflector having a ridged surface facing the optical cell and an opposite surface opposite the ridged surface, the ridged surface including a series of ridges; each of said ridges having a first face and a second face; the reflective layer generally overlying the first face of each of said ridges, the second face being light-transmissive and substantially free of the reflective layer, the second face of each of ridges being in optical communication with the opposite surface.

16. The optical display device according to claim 15 wherein the first face has a first angle relative to a plane parallel to the opposite surface and wherein the second face has a second angle relative to the plane, the first angle being acute and the second angle being at least ninety degrees when the first angle and the second angle are measured along the same rotational direction from the plane.

17. The optical display device according to claim 15 wherein the first face has a first angle relative to a plane parallel to the opposite surface and wherein the first angle has a range from approximately fifteen to twenty-five degrees.

18. The optical display device according to claim 15 wherein the transmissive layer is substantially transparent to white humanly visible light.

19. The optical display device according to claim 15 wherein the transmissive layer is substantially transparent to a humanly visible light of a selected color; and wherein the transmissive layer contains a dye selected from the group consisting of optically-active dyes and dichroic dyes.

20. The optical display device according to claim 15 wherein the transmissive layer is an optically frequency selective filter; and wherein the transmissive layer contains a dye selected from the group consisting of an optically active dye and a dichroic dye.

21. The optical display device according to claim 15 wherein the transmissive layer is composed of a polymer selected from the group consisting of acrylate resin, silicone, polyester resin, polycarbonate, and epoxy resin.

22. The optical display device according to claim 15 wherein the reflective layer is formed of a metallic material.

23. The optical display device to claim 15 wherein the first face is curved.

24. The optical display device according to claim 15 wherein the first face is concavely curved such that a cross-sectional slope of the first face is substantially uniform throughout each of said ridges.

25. The optical display device according to claim 15 wherein the ridged reflector is characterized by an energy ratio representing a proportion of emerging light from the second faces to incident light illuminating the opposite surface; and wherein the first face has a degree of concavity arranged to convey light emerging from the second face such that the energy ratio is at least ten percent.

26. The optical display device according to claim 15 wherein ridged reflector is characterized by an energy ratio representing a proportion of emerging light from the second faces to incident light illuminating the opposite surface; and wherein the first face has a degree of concavity arranged to convey light emerging from the second face such that the energy ratio is approximately ten to twenty percent.

27. The optical display device according to claim 15 wherein the first face is convexly curved such that a cross-sectional slope of the first face is substantially uniform throughout each of said ridges.

28. The optical display device according to claim 15 wherein the first face is concavely and parabolically curved such that a cross-sectional slope of the first face varies parabolically throughout each of said ridges.

* * * * *